United States Patent

[11] 3,604,787

[72] Inventors Peter Arnold Merigold
Prestatyn, Flintshire;
Philip J. Rogers, Meliden, Flintshire, both of, North Wales
[21] Appl. No. 825,209
[22] Filed May 16, 1969
[45] Patented Sept. 14, 1971
[73] Assignee Pilkington Perkin-Elmer Limited
Liverpool, England
[32] Priority May 21, 1968
[33] Great Britain
[31] 24206/68

[54] VARIABLE TRACK LENGTH PHOTOCOPIER LENS SYSTEM
2 Claims, 1 Drawing Fig.
[52] U.S. Cl. ........................................... 350/216, 350/227, 350/255
[51] Int. Cl. ....................................... G02b 7/04, G02b 9/26, G02b 9/60

[50] Field of Search............................................ 350/216, 215, 221, 226, 227

[56] References Cited
UNITED STATES PATENTS

| | | | |
|---|---|---|---|
| 3,202,051 | 8/1965 | Bechtold ...................... | 350/226 |
| 3,301,130 | 1/1967 | Buchroeder et al. ......... | 350/227 |
| 3,370,904 | 2/1968 | Hudson ....................... | 350/221 X |
| 3,436,145 | 4/1969 | Bechtold ...................... | 350/215 |

Primary Examiner—John K. Corbin
Attorney—Mattern, Ware and Davis

ABSTRACT: An optical lens system comprises a symmetrical anastigmatic lens unit in combination with a two-element variable-power unit which permits variation in the total distances between the object and image planes with maintained aberration correction.

PATENTED SEP 14 1971 3,604,787
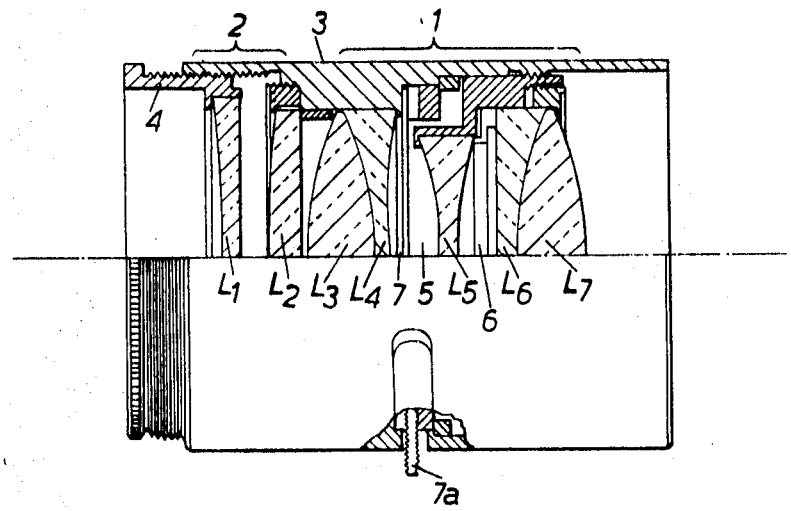
Inventor 3,604,787

VARIABLE TRACK LENGTH PHOTOCOPIER LENS SYSTEM

BACKGROUND OF THE INVENTION

This invention relates to optical lens systems, and is particularly, but not exclusively, applicable to lens systems for use in document-copying apparatus.

When fitting a lens system to an apparatus such as a document copier in which it is to be used, it is desirable that the total distance between the object and image planes of the system have a predetermined value to close limits of tolerance. To obtain such close limits with a lens system produced in quantity would generally prove difficult and expensive.

An object of this invention is to provide a system which permits of variation or adjustment of the total distance between the object and image planes.

SUMMARY

The present invention provides an optical lens system comprising a symmetrical anastigmatic lens unit in combination with a two-element variable-power unit which permits variation in the total distance between the object and image planes with maintained aberration correction.

In the system according to the invention larger tolerances are permitted in the anastigmatic lens unit than would be permissible in the absence of the variable-power unit. When the system is installed in an apparatus such as a copier, any significant departure of the distance between the object and image planes, which will be referred to herein as the "track length," resulting from the aggregate of the tolerance variations in the anastigmatic unit, can be corrected by means of the variable power unit.

Preferably the range of variation of the total distance between the object and image planes, or track length, is between 3.95 F and 4.15 F, where F is the equivalent focal length of the system for an infinity conjugate.

The system is preferably corrected to operate at a maximum relative aperture of $f/4.7$. Although the system is particularly useful for application to the document-copying field, it is not restricted in its application to this field.

The anastigmatic lens unit preferably has substantially equal air separations. A variable-aperture device such as a mechanical iris may be included in the anastigmatic lens unit. In a preferred embodiment of the invention the variable-aperture device is positioned asymmetrically with respect to the number of lens elements in the anastigmatic unit, the variable-power unit being disposed on the side of the anastigmatic unit which is closer to the variable-aperture device.

Lens systems in accordance with the invention can be designed to give unit magnification over a wide semifield angle of, for example, 35°.

In one embodiment of the invention the variable-power unit comprises a planoconvex lens element which is fixed relative to the anastigmatic lens unit and a planoconcave lens element which is adjustable in position relative to the fixed element to vary the power of said variable-power unit.

The anastigmatic lens unit may have different forms: for example said lens unit may comprise three or five lens elements including a central negative lens element, or may comprise four lens elements.

BRIEF DESCRIPTION OF THE DRAWINGS

The FIGURE is, by way of example, a diagrammatic partially sectioned elevation of a lens system according to the invention.

DESCRIPTION OF THE PREFERRED EMBODIMENT

The lens system illustrated comprises a symmetrical five-element anastigmatic lens unit 1 of known type in combination with a two-element variable power unit 2. As illustrated, the object plane of the system is to the left of the system and the image plane to the right. The seven lens elements are numbered consecutively $L_1$–$L_7$ from left to right, so that the variable-power unit comprises planoconcave and planoconvex lens elements $L_1$, $L_2$ respectively and the anastigmatic unit comprises elements $L_3$–$L_7$, the unit 2 being in this case disposed in front of the unit 1.

The five elements $L_3$–$L_7$ of the anastigmatic unit 1 and the rear element $L_2$ of the variable-power unit 2 are mounted in fixed relative positions in a tubular lens mount 3, using conventional spacer rings to give the required spacing between the elements. The front element $L_1$ of the variable-power unit 2 is mounted in a tubular support 4 which is in screw-threaded engagement with one end of the mount 3. Rotation of the support 4 relative to the mount 3 is therefore effective to vary the separation of the elements $L_1$ and $L_2$ and thereby the power of the unit 2.

The five lens elements $L_3$–$L_7$ of the anastigmatic unit 1 are symmetrical, that is to say, the elements $L_3$ and $L_7$ are identical, and the elements $L_4$ and $L_6$ are identical, and the central element $L_5$ is symmetrical. In the illustrated embodiment the elements $L_3$, $L_7$ are collective and form respective doublets with the elements $L_4$, $L_6$, which are dispersive; the central element $L_5$ is dispersive and is separated from the two doublets $L_3$, $L_4$ and $L_6$, $L_7$ by respective airgaps 5 and 6 which in this case are unequal, the gap 5 being larger than the gap 6.

A variable aperture device in the form of a mechanical iris diaphragm 7 controlled by a lever 7a is mounted in the airgap 5 which is nearer the variable-power unit 2. By positioning the iris 7 in the gap 5 closer to the unit 2, asymmetry of the oblique aberrations of astigmatism, distortion, coma and oblique chromatic aberration caused by the variable-power unit 2 can be corrected.

Adjustment of the separation of the elements $L_1$, $L_2$ of the variable-power unit 2 by relative rotation of the mount 3 and support 4, as described previously, causes variation of the track length of the system. The track length of the system can therefore be adjusted to a given fixed value when the system is installed in apparatus such as, for example, a document copier. The presence of the variable-power unit 2 therefore permits a greater tolerance for the dimensions of the elements of the anastigmatic unit 1 than would otherwise be acceptable. Consequently manufacture can be cheapened. The system is also such that advantage can be taken of simple and hence inexpensive types of optical glass for the lens elements.

The variable-power unit 2 in this embodiment is arranged to give a range of variation of the track length T of the system, while maintaining aberration correction, of 3.95 F to 4.15 F, where F is the equivalent focal length of the system for an infinity conjugate.

Numerical data relating to one example of a system as illustrated in the drawing are given below in Table 1. Radii of curvature (R), lens thicknesses (d) and separations (S) are numbered consecutively from left to right of the drawing; radii of curvature are given as positive or negative according as the surfaces in question are convex or concave towards the object plane (i.e. towards the left of the drawing). The Table also gives the refractive index $N_d$ for the sodium d-line and the Abbe V-number (V) for each lens element $L_1$–$L_7$.

Other data relating to this lens system are as follows:
  Magnification = 1:1
  Equivalent focal length F = 100
  Focal lengths of component lens elements:
    $F_1 = -F_2 = -7.16\ F$
    $F_{3,4} = F_{6,7} = 0.528\ F$
    $F_5 = -0.320\ F$
  Nominal track length T = 4.0617 F
  Minimum track length = 4.05 F
  Maximum track length = 4.074 F
  Maximum $f$ number = $f/4.7$
  Position of Iris 7 = 0.0135 F behind $L_4$.

The following ranges for various parameters of the system have been found to give the most satisfactory results:
  1. R1 should be numerically equal to R3 and lie between 2.5

TABLE I

| Lens | Radii | Thickness | Separation | $N_d$ | V |
|---|---|---|---|---|---|
| $L_1$ | $R_1=-371.4350$ | $d_1=1.9050$ | | $N_1=1.51899$ | $V_1=60.42$ |
| | $R_2=\infty$ | | $S_1=2.5780^*$ Air | | |
| $L_2$ | $R_3=+371.4350$ | $d_2=2.5400$ | | $N_2=1.51899$ | $V_2=60.42$ |
| | $R_4=\infty$ | | $S_2=0.6350$ Air | | |
| $L_3$ | $R_5=+34.2900$ | $d_3=5.7855$ | | $N_3=1.62040$ | $V_3=60.29$ |
| $L_4$ | $R_6=-29.7180$ | $d_4=1.6330$ | | $N_4=1.53033$ | $V_4=51.19$ |
| | $R_7=+242.3945$ | | $S_3=3.8650$ Air | | |
| $L_5$ | $R_8=-34.2900$ | $d_5=1.6865$ | | $N_5=1.53033$ | $V_5=51.19$ |
| | $R_9=+34.2900$ | | $S_4=3.5225$ Air | | |
| $L_6$ | $R_{10}=-242.3945$ | $d_6=1.6330$ | | $N_6=1.53033$ | $V_6=51.19$ |
| $L_7$ | $R_{11}=+29.7180$ | $d_7=5.7855$ | | $N_7=1.62040$ | $V_7=60.29$ |
| | $R_{12}=-34.2900$ | | | | |

*$S_1$ variable from 0.5055 to 4.4680.

F and 5 F,
2. S3 and S4 should be between 0.03 F and 0.045 F,
3. R5, R8, R9, R12 should preferably be equal and lie between 0.3 F and 0.4 F,
4. R7, R10 should preferably be equal and lie between −2 F and 3 F,
5. R6, R11 should preferably be equal and lie between 0.25 F and 0.35 F,
6. The track length T should be variable between 3.95 F and 4.15 F,
7. S1 should be variable between 0.005 F and 0.1 F.

The parameters of the glass employed in the various lens elements preferably lie in the following ranges of values:
   i. N4=N5=N6 and lies between 1.50 and 1.55
   ii. N3=N7 and lies between 1.60 and 1.65
   iii. N1=N2 and lies between 1.475 and 1.60
   iv. V4=V5=V6 and lies between 45 and 55
   v. V3=V7 and lies between 55 and 65
   vi. V1=V2 and lies between 55 and 65
   vii. (N2−N4) and (N7−N6) lie between 0.075 and 0.15
   viii. (V3−V4) and (V7−V6) lie between 7.5 and 12.5.

We claim:
1. An optical lens system comprising a five-element anastigmatic lens unit in combination with a two-element variable power unit which permits variation in the total distance between the object and image planes with maintained aberration correction, the various elements have numerical values substantially as follows:

wherein lenses $L_1$ and $L_2$ form the variable power unit and the lenses $L_3$ to $L_7$ form the anastigmatic unit, R1 to R10 represent the radii of curvature of the lens surfaces from lens $L_1$ to lens $L_7$ respectively, N1 to N7 represent the refractive indices of the lenses $L_1$ to $L_7$ respectively for the sodium d-line, $V_1$ to $V_7$ represent the Abbe V number for the lenses $L_1$ to $L_7$ respectively, and S1 to S4 are the separations between lenses $L_1$ and $L_2$, $L_2$ and $L_3$, $L_4$ and $L_5$, and $L_5$ and $L_6$ respectively.

2. An optical lens system comprising a five-element anastigmatic lens unit in combination with a two-element variable power unit which permits variation in the total distance between the object and image planes with maintained aberration correction, wherein a. lenses $L_1$ and $L_2$ form the variable power unit and lenses $L_3$ to $L_7$ form the anastigmatic unit,
b. R1 to R12 represent the radii of curvature of the lens surfaces from lens $L_1$ to lens $L_7$ respectively,
c. R2 equals R4 and both are infinite,
d. R3 equals minus R1
e. The ratio of R5 to R1 is −34.2900 to 371.4350
f. the ratio of R6 to R1 is 29.7180 to 371.4350
g. the ratio of R7 to R1 is −242.3945 to 371.4350,
h. R8 equals −R5,
i. R9 equals R5,
j. R10 equals minus R7,
k. R11 equals minus R6
l. R12 equals minus R5

| Lens | Radii | Thickness | Separation | Refractive index, $N_d$ | Abbé number, V |
|---|---|---|---|---|---|
| $L_1$ | $R_1=-371.4350$ | $d_1=1.9050$ | | $N_1=1.51899$ | $V_1=60.42$ |
| | $R_2=\infty$ | | $S_1^*$ Air | | |
| $L_2$ | $R_3=+371.4350$ | $d_2=2.5400$ | | $N_2=1.51899$ | $V_2=60.42$ |
| | $R_4=\infty$ | | $S_2=0.6350$ Air | | |
| $L_3$ | $R_5=+34.2900$ | $d_3=5.7855$ | | $N_3=1.62040$ | $V_3=60.29$ |
| $L_4$ | $R_6=-29.7180$ | $d_4=1.6330$ | | $N_4=1.53033$ | $V_4=51.19$ |
| | $R_7=+242.3945$ | | $S_3=3.8650$ Air | | |
| $L_5$ | $R_8=-34.2900$ | $d_5=1.6865$ | | $N_5=1.53033$ | $V_5=51.19$ |
| | $R_9=+34.2900$ | | $S_4=3.5225$ Air | | |
| $L_6$ | $R_{10}=-242.3945$ | $d_6=1.6330$ | | $N_6=1.53033$ | $V_6=51.19$ |
| $L_7$ | $R_{11}=+29.7180$ | $d_7=5.7855$ | | $N_7=1.62040$ | $V_7=60.29$ |
| | $R_{12}=-34.2900$ | | | | |

*Variable from 0.5055 to 4.4680.

m. the thickness of the lenses $L_1$ to $L_7$ are respectively $d1$ to $d7$ where the ratio of $d1$ to $R1$ is 1.9050 to 371.4350, the ratio of $d2$ to $d1$ is 2.5400 to 1.9050, the ratio $d3$ to $d1$ is 5.7855 to 1.9050, the ratio $d4$ to $d1$ is 1.6330 to 1.9050, the ratio $d5$ to $d1$ is 1.6865 to 1.9050, $d6$ equals $d4$, and $d7$ equals $d3$, n. the separation between lenses $L_1$ and $L_2$, $L_2$ and $L_3$, $L_4$ and $L_5$, and $L_6$ and $L_7$ are respectively $S_1$, $S_2$, $S_3$ and $S_4$ where the ratio $S_1$ to $R_1$ is variable from 0.5055 to 371.4350, to 4.4680 to 371.4350, the ratio $S_2$ to $R_1$ is 0.6350 to 371.4350, the ratio $S_3$ to $S_2$ is 3.8650 to 0.6350, and the ratio $S_4$ to $S_2$ is 3.5225 to 0.6350 o. the refractive indices of the lens $L_1$ to $L_7$ for the sodium d-line are $N_1$ to $N_7$ respectively where $N_1$ equals 1.51899, $N_2$ equals $N_1$, $N_3$ equals 1.62040, $N_4$ equals 1.53033, $N_5$ equals $N_4$, $N_6$ equals $N_4$, and $N_7$ equals $N_3$, and p. the Abbe V numbers of the lenses $L_1$ to $L_7$ are respectively $V_1$ to $V_7$ where $V_1$ equals 60.42, $V_2$ equals $V_1$, $V_3$ equals 60.29, $V_4$ equals 51.19, $V_5$ equals $V_4$, $V_6$ equals $V_4$ and $V_7$ equals $V_3$.